United States Patent [19]
Buckley

[11] Patent Number: 6,082,509
[45] Date of Patent: *Jul. 4, 2000

[54] FLUID PRESSURIZATION SYSTEM

[75] Inventor: James A. Buckley, Whitefish Bay, Wis.

[73] Assignee: Hayes Brake, Inc., Mequon, Wis.

[ * ] Notice: This patent is subject to a terminal disclaimer.

[21] Appl. No.: 09/021,337

[22] Filed: Feb. 10, 1998

[51] Int. Cl.$^7$ ...................................................... B60T 11/00
[52] U.S. Cl. ........................ 188/359; 188/152; 188/72.4; 188/151 R
[58] Field of Search ................................. 188/358, 359, 188/152, 72.5, 151 R, 72.4; 60/385, 583

[56] References Cited

U.S. PATENT DOCUMENTS

| | | | |
|---|---|---|---|
| 3,064,432 | 11/1962 | Shutt | 60/562 |
| 3,186,174 | 6/1965 | Hayman | 60/578 |
| 3,621,945 | 11/1971 | Spry | 188/74.5 |
| 3,792,433 | 2/1974 | Wada | 188/1.11 R |
| 3,804,212 | 4/1974 | Haraikawa | 188/72.4 |
| 3,999,807 | 12/1976 | Haraikawa | 188/72.4 |
| 4,093,043 | 6/1978 | Smith | 188/73.46 |
| 4,445,334 | 5/1984 | Derrick | 60/585 |
| 4,913,267 | 4/1990 | Campbell et al. | 188/218 XL |
| 4,941,323 | 7/1990 | Leigh-Monstevens . | |
| 5,038,895 | 8/1991 | Evans | 188/72.7 |
| 5,350,223 | 9/1994 | Stewart | 60/591 |
| 5,529,150 | 6/1996 | Buckley et al. | 188/72.9 |

FOREIGN PATENT DOCUMENTS

| | | |
|---|---|---|
| 86107830 | 6/1986 | European Pat. Off. . |
| 1 366 466 | 10/1972 | United Kingdom . |
| 7910129 | 3/1979 | United Kingdom . |
| 8020643 | 6/1980 | United Kingdom . |

*Primary Examiner*—Robert Oberleitner
*Assistant Examiner*—Devon Kramer
*Attorney, Agent, or Firm*—Foley & Lardner

[57] ABSTRACT

Disclosed herein is an improved braking system. The braking system includes a valving arrangement which reduces the dead band of the system and the freedom to randomly select the pistons return position. In particular, the system includes a fluid reservoir, a piston located in a cylinder including a reservoir port, a first fluid channel connecting the reservoir to the reservoir port, a brake actuator, and a second fluid channel connecting the cylinder to the brake actuator. The piston is moveable within the cylinder to produce fluid flow within the first channel. A first valve is disposed between the reservoir and the cylinder to prevent fluid flow from the cylinder to the reservoir when the piston is moved to pressurize fluid in the second fluid channel.

17 Claims, 3 Drawing Sheets

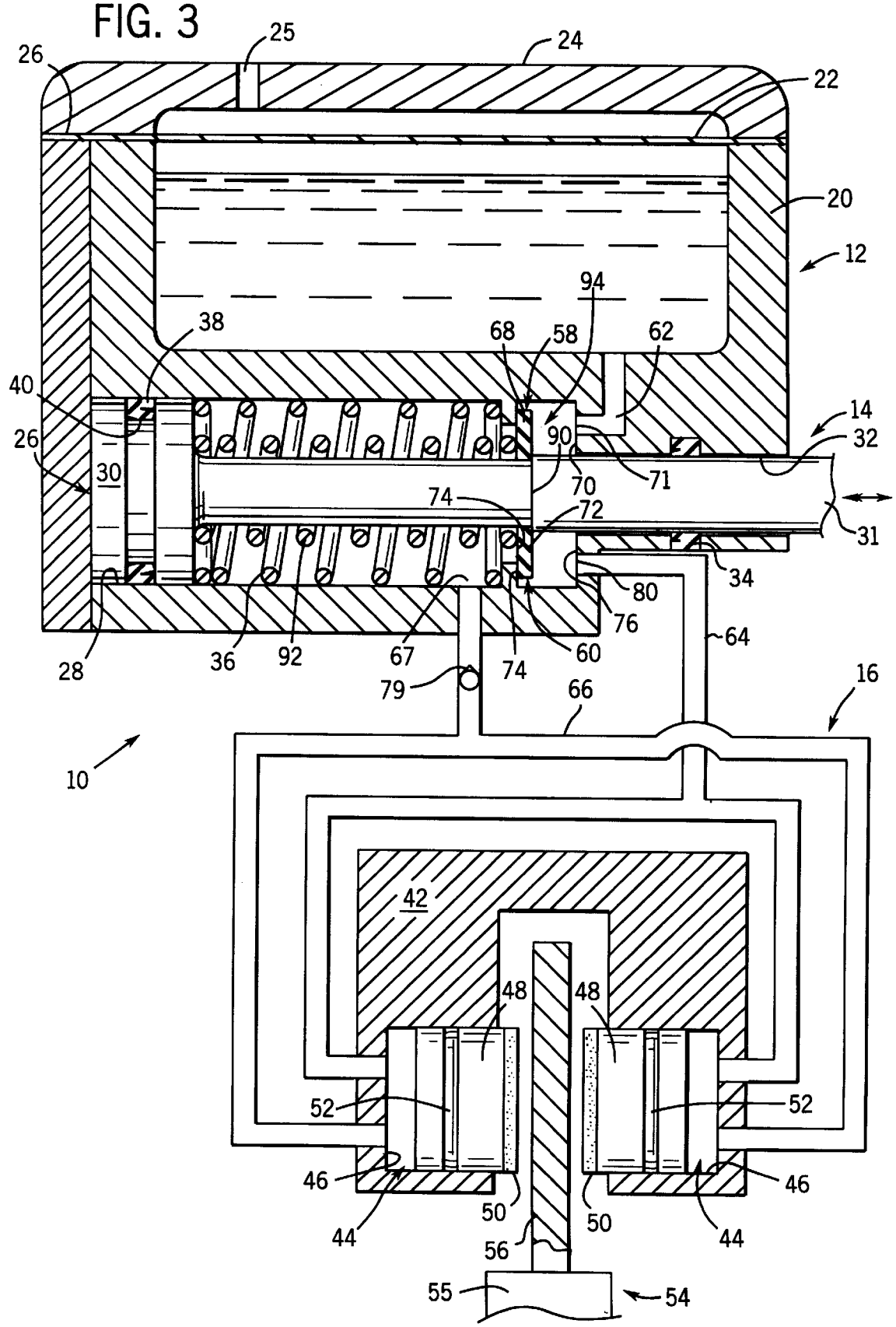

FLUID PRESSURIZATION SYSTEM

FIELD OF THE INVENTION

The present invention relates to a braking system for a vehicle. In particular, the present invention provides improved valving and fluid communication between the fluid reservoir, hydraulic cylinder and brake actuator of a braking system. This improved arrangement reduces or eliminates wasted activation motion of the cylinder to cause hydraulic fluid to move to the brake actuator almost immediately when the cylinder is activated.

BACKGROUND OF THE INVENTION

A typical braking system for a vehicle includes a master cylinder and a hydraulic fluid reservoir which supplies fluid or accepts fluid from the cylinder depending upon fluid conditions (e.g. brake piston movement due to pad wear, fluid cooling, fluid heating, fluid leakage). The master cylinder and reservoir include a fluid conduit coupled therebetween such that fluid only flows between the cylinder and reservoir when the cylinders piston is within a predetermined range of motion (e.g. 5–10%) at the beginning of the pistons stroke. More specifically, the conduit connecting the cylinder and reservoir of a typical systems is connected to a cylinder port which opens to the inside of the cylinder along the predetermined range of motion of the piston at the beginning of its stroke. Accordingly, until the piston moves far enough to cover the port, fluid can flow from the cylinder to the reservoir and the fluid is not pressurized sufficiently to cause the brake actuator to generate the forces required for braking.

The conventional cylinder and reservoir arrangement described above typically requires precision tolerances on the placement of the cylinder port with respect to the piston backstop which defines the beginning of the piston stroke. Additionally, this arrangement requires that the piston and cylinder be fabricated with substantial precision. Furthermore, the range of piston motion between the edge of the piston seal and the cylinder port must be large enough to accommodate rubber swelling which occurs over time. As discussed above, the range of piston motion which is typically required before the piston seal covers and closes the cylinder port is about 5–10% of the pistons stroke. Accordingly, valuable fluid displacement (i.e. fluid displacement pressurized sufficiently to cause the brake actuator to generate forces required for braking) is wasted during piston movement before the cylinder port is covered.

In addition to having lost motion before valuable fluid displacement, conventional cylinder and reservoir arrangements require that the piston be returned to the beginning of its stroke to permit fluid flow between the cylinder and reservoir. More specifically, the piston must be moved such that the cylinder port is uncovered before fluid can flow between the cylinder and reservoir.

In view of the drawbacks of conventional master cylinder and fluid reservoir arrangements, it would be desirable to provide an improved arrangement which reduces or eliminates wasted piston motion during braking. It would also be desirable to provide an arrangement which permits fluid flow between the cylinder and reservoir after braking force is removed from the piston irregardless of the home position of the piston.

SUMMARY OF THE INVENTION

The present invention provides a brake fluid pressurization system. The system includes a fluid reservoir, a piston, a cylinder including a reservoir port, and a fluid channel connecting the reservoir to the reservoir port. The piston is moveable within the cylinder to produce fluid flow within the fluid channel. The system also includes a valve disposed between the reservoir and the cylinder to prevent fluid flow from the cylinder to the reservoir when the piston is moved to pressurize fluid to be applied to a brake actuator such as that for disk or drum brakes.

The present invention also provides a brake assembly including a housing, a cylinder formed in the housing, a hydraulic fluid reservoir formed in the housing and in fluid communication with the brake cylinder, and a caliper frame formed from the housing. The caliper frame includes at least one brake pad support in fluid communication with the housing. The support is configured to guide the brake pad along a linear path when fluid is supplied from the cylinder to the brake pad support.

BRIEF DESCRIPTION OF THE DRAWINGS

FIG. 3 is a schematic representation of another embodiment of the braking system.

DETAILED DESCRIPTION OF THE PREFERRED EMBODIMENT

Figure 1:
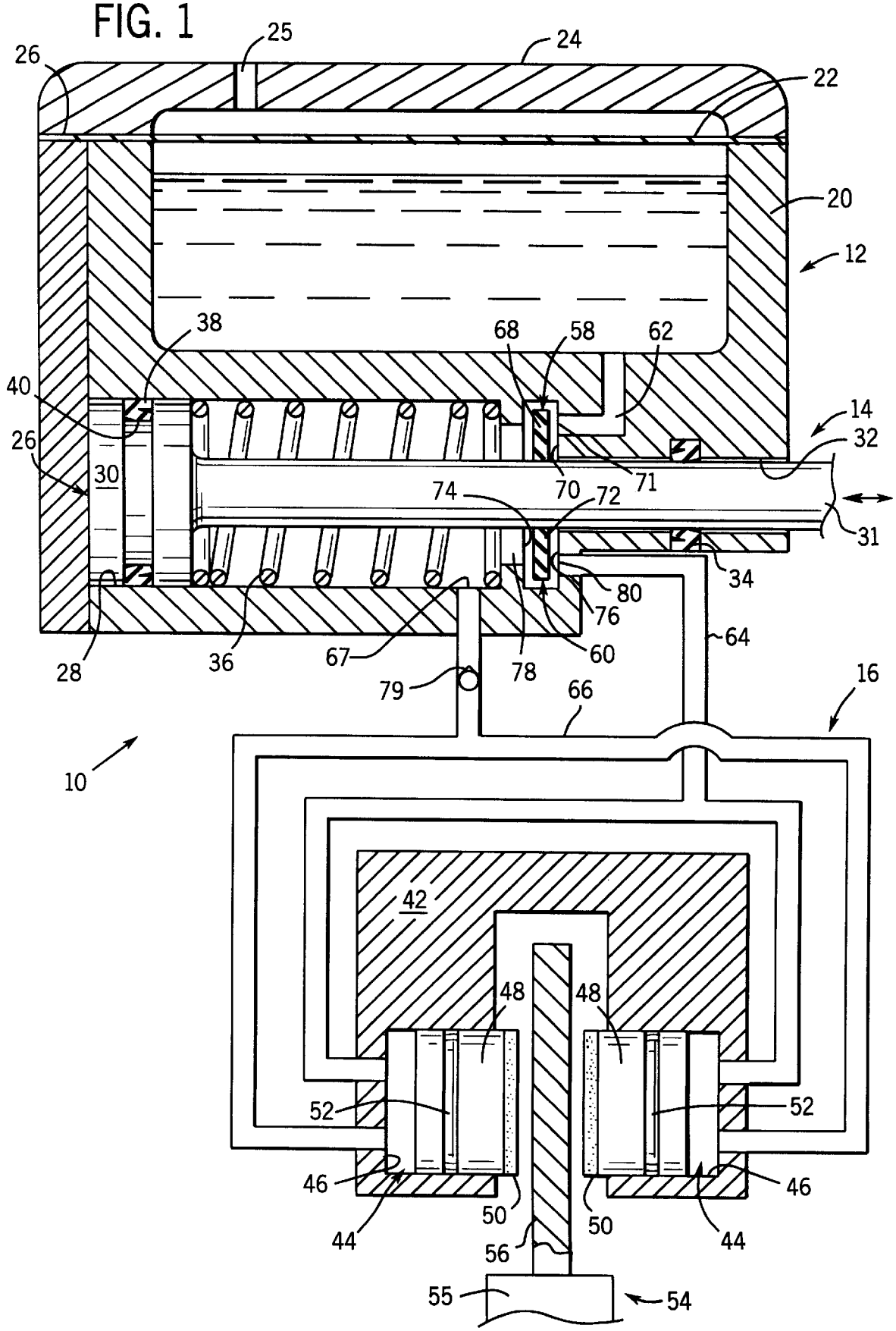
FIG. 1 is a schematic representation of the preferred exemplary embodiment of a braking arrangement in accordance with the present invention.

Referring to FIG. 1, the braking system 10 includes a fluid source 12, a fluid pressurization section 14, a brake actuator 16 and a braking element 54. The fluid source 12 includes a fluid vessel 20 (e.g. rectangular cup, circular cup, oval cup, etc.), a sealed rolling diaphragm 22 or bellows (e.g. elastomeric membrane), and a cover 24 including one or more venting holes 25. Cover 24 is typically fastened to vessel 20 to capture the peripheral edge 26 of diaphragm 22. Depending upon the application, cover 24 may be attached to vessel 20 with screws (not shown) or other appropriate fastening arrangement such as a hinge and latch arrangement.

Figure 2:
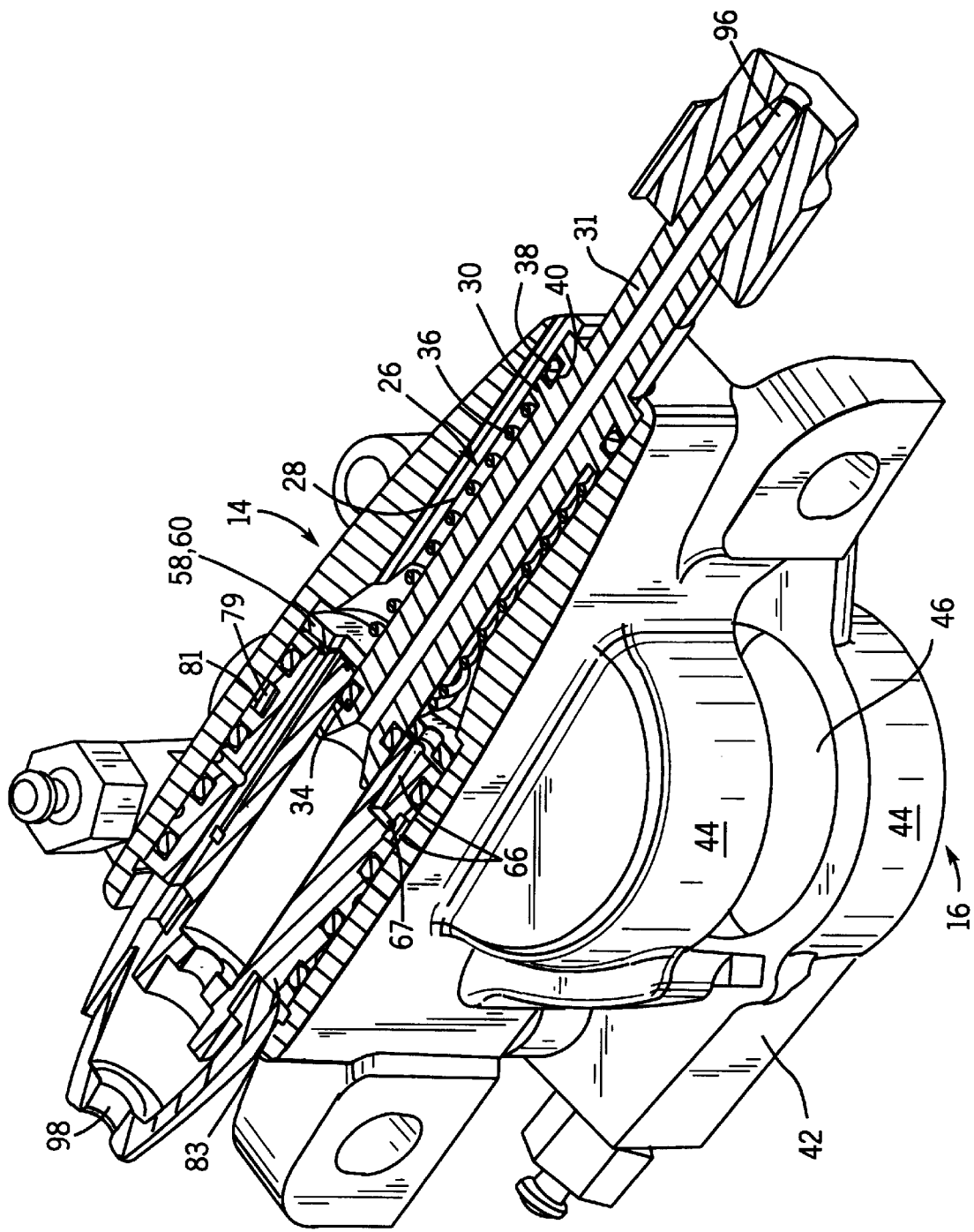
FIG. 2 illustrates an example of a one-piece configuration for braking arrangement.

Fluid pressurization section 14 includes a cylinder 26 defined by a cylinder wall 28, a piston 30 including a piston rod 31, a piston rod guide including a guide wall 32 and a seal 34, and a piston return spring 36. Piston 30 and rod 31 can be fabricated as separate elements which are joined with an appropriate junction such as welding, a thread and screw arrangement, or press fitting rod 31 in a hole in piston 30. Alternatively, piston 30 and rod 31 can be fabricated (e.g. machined, casted, molded, etc.) from a single piece of material. Depending upon the application and materials used for piston 30 and cylinder wall 28, one or more seals 38 (only one shown) may be located in a seal grove 40 in piston 30 to provide an appropriate sliding seal between piston 30 and cylinder wall 26. By way of further alternative, seal 34 may move with rod 31 as shown in FIG. 2.

By way of example only, vessel 20 may be fabricated from metal or plastic, diaphragm 22 may be fabricated from an elastomer, vessel 20 may be fabricated from metal or plastic, cylinder wall 26 may be fabricated from metal or plastic, piston 30 may be fabricated from metal or plastic, piston rod 31 may be fabricated from metal or plastic, seal 34 can be fabricated from elastomer, and seal 38 may be fabricated from elastomer.

Brake actuator 16 may be of the type for use with drum or disk brakes. The embodiment of actuator 16 disclosed herein is for use in a disk brake braking system. Actuator 16 includes a housing or frame 42, and a pair of opposed brake pad guides or cylinders 44 which are defined by cylinder walls 46. Actuator 16 also includes a pair of pistons 48 each disposed within a cylinder 44. Each piston 48 includes a brake pad 50 which may or may not be attached thereto depending upon the application. Depending upon the application and materials used for pistons 48 and cylinder walls 46, one or more seals 52 (only one shown) may be located in seal groves in pistons 48 to provide an appropriate sliding seal between pistons 48 and the respective cylinder walls 46.

In operation, as described in further detail below, when brake fluid in cylinders 44 is pressurized, pistons 48 move toward each other to a brake rotor 54 disposed therebetween and appropriately attached to the wheel hub 55 or axle of a vehicle such as a bike, motorcycle, car or truck. After sufficient movement, pistons 48 force their respective brake pads 50 against the braking surface 56 of rotor 54 to resist and/or stop rotation of rotor 54.

Brake actuator 16 has been described as having a pair of pistons 48 and associated brake pads 50. However, actuator 16 could be of the type with a single piston 48 and associated pad 50. With this configuration, the second pad is stationary and the actuator is mounted to the associated vehicle to permit frame 42 to move such that the one piston 48 generates the motion required to force both pads 50 against rotor 54 to generate a braking force.

By way of example only, frame 42 may be fabricated from metal, cylinder walls 46 may be fabricated from metal, pistons 48 may be fabricated from metal or plastic, brake pads 50 may be fabricated from compound materials, seals 52 can be fabricated from elastomers, and rotor 54 may be fabricated from metal or any other appropriate material for the applicable application.

Turning now to the valving and fluid flow arrangements for braking system 10, the valving includes a reservoir valve seal portion 58 and a fluid return valve seal portion 60. (Depending upon the application, seals 58 and 60 may be formed as part of a single seal unit, or individually. The fluid flow arrangement includes a fluid channel or conduit 62 extending from fluid vessel 20 to cylinder 26, a fluid return channel or conduit 64 extending from cylinder 26 to cylinders 44, and a fluid supply channel or conduit 66 extending from cylinder 26 to cylinders 44. Conduits 62, 64 and 66 can be formed from appropriate tubing, or can be formed from the housings for the components of system 10 as described in further detail below in reference to FIG. 2 below.

Reservoir valve 58 is a diaphragm type valve located over conduit 62 between vessel 20 and cylinder 26. Valve 58 includes a thickened portion 68 supported by a flexible periphery so that valve 58 is biased away from valve seat 70 if the pressure differential between the fluid in cylinder 26 and vessel 20 is within a predetermined range (e.g. 20 psi). More specifically, during movement of piston 30 to pressurize fluid applied to actuator 16, the fluid pressure in cylinder 26 is greater than the pressure in vessel 20 which is typically at atmospheric pressure. This causes valve portion 68 to be forced against valve seat 70, close the reservoir port 71 to channel 62, and prevent fluid flow from cylinder 26 back to vessel 20 during brake actuation. However, when actuation of piston 30 is terminated and piston 30 is returned to its unactuated position by spring 36, valve portion 68 is biased away from port 71 so that fluid may pass around portion 72 to permit fluid to or from vessel 20 depending upon the fluid volume excess of deficiency in cylinder 26.

Fluid return valve 60 is a diaphragm type valve located in conduit 64 between cylinder 26 and cylinders 44. Valve 60 includes a thickened portion 72 supported by a flexible periphery so that valve 60 is biased between back stop 74 and valve seat 76. Valve seat 76 includes a port 80. Valve 60 are configured such that during piston actuation the fluid pressure in cylinder 26 can bias valve portion 72 against seat 72 to prevent fluid flow from cylinders 44 to cylinder 26 during brake actuation. However, when actuation of piston 30 is terminated and piston 30 is returned to its unactuated position by spring 36, valve portion 72 is sufficiently biased between passage 78 and 80 so that fluid may pass around portion 72 to permit fluid to return from cylinders 44 to cylinder 26 and thus retract pistons 52 away from rotor 54. Depending upon the application, a check valve 79 may be provided in conduit 66 to prevent fluid flow into cylinder 26 from conduit 66 when actuation is terminated, thus, promoting a continuing fluid recirculation which allows continuous air removal from the system (self-bleeding).

FIG. 2 illustrates one configuration of check valve 79 which is a rectangular cross-section rubber band which rests within a rectangular groove 81 which extends around a cylindrical porting manifold 83 which includes a portion of the porting shown schematically in FIG. 1. In operation, when fluid is forced by piston 30 through conduit 66 toward cylinders 44, the rubber band lifts away from port 67 and permits fluid flow. However, fluid is prevented from flowing back into cylinder 26 through conduit 66 because the rubber band is biased against port 67 and fluid flowing back serves to further force the band against port 67.

Turning now to the overall operation of braking system 10, hydraulic fluid is stored in vessel 20, cylinder 26, conduits 62, 64 and 66 and cylinders 44. When piston 30 is moved against the force of spring 36 by the application of the appropriate force (e.g. from a cable, electronic actuator or other actuator), the pressure of fluid in cylinder 26 increases to pressurize the fluid in conduits 64 and 66 and cylinders 44. This pressurization causes valves 58 and 60 to close abruptly as discussed above so that substantially all the motion of piston 30 translates into motion of pistons 48. Thus, the valving arrangement substantially reduces the amount piston 30 must move before pistons 48 move to engage pads 50 with brake rotor 54. In other words, the actuation dead-band of pressurization section 14 of system 10 is reduced to near zero.

When the force is removed from piston 30, spring 36 returns piston 30 to its inactivated position. During the return, valves 58 and 60 are biased, as described in detail above, such that fluid may return from cylinders 44 to cylinder 26 via conduit 64 to retract pistons 48 away from rotor 54. Additionally, fluid may move between cylinder 26 and vessel 20 as necessary.

By way of example only, valves 58 and 60 may be fabricated from elastomer and the valves may be placed substantially at the end of cylinder 26 as shown in FIG. 1. Additionally, the fluid outlet port from cylinder 26 to conduit 66 may be placed substantially at the end of cylinder 26 as shown in FIG. 1. However, the placement of the ports from cylinder are considered placed substantially at the end of the cylinder if they are not covered by piston 30 while it is moving in its normal range of motion during brake actuation.

Referring to FIG. 2, FIG. 2 illustrates a preferred configuration for braking system 10. In this configuration, all or a portion of fluid reservoir 12, fluid pressurization section 14, and brake actuator 16 are fabricated from a single piece housing. In particular, vessel 20, cylinder wall 28 and frame 42 are all cast from the single piece housing. Furthermore, the fluid conduits or passages between vessel 20, cylinder 26 and actuator 16 are formed within the single piece. This configuration provides a self-contained braking system which can be mounted at the wheel of a bike, motorcycle, car or truck without the need for a master cylinder at another location on the vehicle. Furthermore, piston 30 can be connected directly to a brake cable attached to a brake handle or pedal. Additionally, piston 30 can be attached to an electric actuator such as a solenoid or stepping motor arrangement which is electrically coupled to the braking system including the antilock system of the respective vehicle.

In addition to the reduction in the brake actuation deadband of system 10 as a result of the valving discussed in detail above, the configuration of FIG. 2 further reduces the brake actuation dead-band of system 10 by reducing the length of the fluid conduit between pressurization section 14 and actuator 16. This reduction in length reduces the friction and system expansion losses generated during fluid pressurization in longer fluid conduits.

Referring now to FIG. 3, another embodiment of fluid pressurization section 14 is illustrated. In this embodiment, valve seal portions 58 and 60 are formed as a single piece valve and is captured on piston rod 31 betweeen a shoulder 90 and a spring 92. Additionally, the cylindrical cavity 94 within which the single piece valve is located is wider than the embodiment shown in FIG. 1. This width permits the at-rest position of piston 30 and rod 31 to be varied such that the sensitivity of the braking system can be adjusted. More specifically, if the at-rest position is adjusted to maintain the valve as far away from ports 71 and 80, more motion of piston 30 will be permitted before the valve closes ports 71 and 80, and fluid is forced into cylinders 44 than if the at-rest position is adjusted to maintain the valve relatively close to ports 71 and 80. By way of example, the width of cavity 94 may be in the range of 10 to 40 percent of the width of cylinder 26 (i.e. total available travel of cylinder 30). Preferably, the width is in the range of 15 to 25 percent, and more preferably at about 20 percent.

By way of example, the configuration of pressurization section 14 as shown in FIG. 3 may be advantageously used in motorcycles and bicycles. In bicycles, some users (typically off-road users) desire the ability to adjust brake sensitivity, the amount of brake handle (not shown) motion for braking, and/or brake handle position. Depending upon the application, the brake handle is attached to rod 31 with an appropriate cable (not shown). Referring to FIG. 2, rod 31 is provided with a cable passage 96. The cable extends from an opening 98 through passage 96 to a shoulder 100 against which an adjustment nut engaged with the cable may abut. The location of the valve may be adjusted with this nut when the valve configuration of FIG. 3 is incorporated into the one piece configuration of FIG. 2.

The configuration of FIG. 3 permits the user to bring the handle closer to the handle bar before braking when the valve is at its at-rest state at locations within cavity 94 relatively far from ports 71 and 80. The configuration also permits the user to reduce handle motion prior to braking when the valve is at its at-rest state at locations within cavity 94 relatively close to ports 71 and 80.

While one embodiment and certain modifications to and uses of the preferred embodiment of the present invention have been shown and describe herein, other modifications and uses may become apparent. Such modifications and uses may be made without departing from the spirit or scope of the invention. For example, many vehicles include hydraulically operated clutches which control the transmission of power from a motor or engine to a drive train. It is contemplated that the fluid pressurization and valving arrangements disclosed herein could be used for pressurizing hydraulic actuators for clutches.

What is claimed is:

1. A fluid pressurization system comprising:
   a fluid reservoir;
   a cylinder including a first end and a second end, the cylinder including a reservoir port located generally at the second end;
   a piston movable within the cylinder between first and second ends;
   a fluid channel connecting the reservoir to the reservoir port, the piston being moveable within the cylinder to produce fluid flow within the fluid channel;
   a fluid outlet port configured to supply fluid from the cylinder to an actuator; and
   a first valve disposed substantially at the second end of the cylinder and configured to abruptly close the reservoir port and thereby prevent fluid flow from the cylinder to the reservoir when the piston is moved to pressurize fluid at the fluid outlet port.

2. The system of claim 1, further comprising a housing which defines at least a portion of the cylinder, reservoir and the fluid channel.

3. The system of claim 1, further comprising a fluid conduit coupled to the fluid outlet port to supply fluid to the actuator.

4. The system of claim 1, further comprising a fluid return port located in the cylinder configured to communicate with the actuator.

5. The system of claim 4, further comprising a one-way check valve disposed to prevent fluid flow from the outlet port into the cylinder when the piston is returned to home position and pressure drops to atmospheric.

6. The system of claim 1, wherein the first valve is located substantially at the reservoir port.

7. The system of claim 1, wherein the reservoir and cylinder are integrally formed from a common housing and the housing includes a passage which defines the fluid channel.

8. A braking system comprising:
   a fluid reservoir;
   a cylinder including a first end and a second end, the cylinder including a reservoir port located generally at the second end;
   a first fluid channel connecting the reservoir to the reservoir port;
   a piston movable within the cylinder between first and second ends;
   a brake actuator;
   a second fluid channel connecting the cylinder to the brake actuator, the piston being moveable within the cylinder to produce fluid flow within the fluid channel; and
   a first valve disposed substantially at the second end of the cylinder and configured to abruptly close the reservoir port and thereby prevent fluid flow from the cylinder to the reservoir when the piston is moved to pressurize fluid in the second fluid channel.

9. The system of claim 8, wherein the brake actuator is a disk-brake caliper.

10. The system of claim 8, further comprising a housing which defines at least a portion of the cylinder, reservoir and the first fluid channel.

11. The system of claim 8, further comprising a fluid return channel connected between the cylinder and the brake actuator.

12. The system of claim 11, further comprising a second valve disposed to prevent fluid flow from the fluid return channel into the cylinder when the piston is moved to pressurize fluid in the second fluid channel.

13. The system of claim 8, wherein at least a portion of the reservoir, cylinder and brake actuator are formed from a common housing and the housing includes passages which define the first and second channels and the fluid return channel.

14. A brake assembly comprising;

a housing;

a cylinder formed in the housing;

a hydraulic fluid reservoir formed in the housing and in fluid communication with the cylinder; and a caliper frame formed from the housing and including at least one brake pad support in fluid communication with the housing, the support being configured to guide the at least one brake pad along a linear path when fluid is supplied from the cylinder to the brake pad support.

15. The assembly of claim 14 further comprising:

a piston;

a first fluid channel formed in the housing to provide the fluid communication between the cylinder and the reservoir;

a second fluid channel formed in the housing to provide the fluid communication between the cylinder and the brake pad support; and a first valve disposed between the reservoir and the cylinder to prevent fluid flow from the cylinder to the reservoir when the piston is moved to pressurize fluid in the second fluid channel.

16. The assembly of claim 14, further comprising a fluid return channel connected between the cylinder and the brake pad support.

17. The assembly of claim 16, further comprising a second valve disposed to prevent fluid flow from the fluid return channel into the cylinder when the piston is moved to pressurize fluid in the second fluid channel.

* * * * *